United States Patent
Lax et al.

(10) Patent No.: US 11,142,337 B2
(45) Date of Patent: Oct. 12, 2021

(54) METHOD AND SYSTEM FOR DETERMINING A DESCENT PROFILE

(71) Applicant: GE AVIATION SYSTEMS LLC, Grand Rapids, MI (US)

(72) Inventors: David Michael Lax, Cascade Township, MI (US); Reza Ghaemi, Watervliet, NY (US); Pierino Gianni Bonanni, Loudonville, NY (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 529 days.

(21) Appl. No.: 16/037,214

(22) Filed: Jul. 17, 2018

(65) Prior Publication Data

US 2020/0023994 A1    Jan. 23, 2020

(51) Int. Cl.
| | |
|---|---|
| *B64D 45/04* | (2006.01) |
| *G05D 1/04* | (2006.01) |
| *G08G 5/00* | (2006.01) |
| *G08G 5/02* | (2006.01) |

(52) U.S. Cl.
CPC ............ *B64D 45/04* (2013.01); *G05D 1/042* (2013.01); *G08G 5/0039* (2013.01); *G08G 5/025* (2013.01)

(58) Field of Classification Search
CPC ........ B64D 45/04; B64D 43/00; B64D 45/08; B64D 2045/0085; B64D 47/08; B64D 35/02; B64D 45/00; G05D 1/042; G05D 1/0676; G05D 17/02; G05D 1/0066; G05D 1/0088; G05D 1/0005; G05D 1/0055; G08G 5/0039; G08G 5/025
See application file for complete search history.

(56) References Cited

U.S. PATENT DOCUMENTS

| | | | | |
|---|---|---|---|---|
| 4,792,906 | A * | 12/1988 | King ...................... | G01C 5/005 244/186 |
| 7,132,960 | B2 * | 11/2006 | Glover ................... | B64D 45/04 340/945 |
| 8,224,505 | B2 * | 7/2012 | Botargues ............ | G05D 1/0688 701/4 |
| 8,457,872 | B2 * | 6/2013 | Deker .................... | G08G 5/045 701/120 |
| 8,515,598 | B2 * | 8/2013 | Louise ................. | G08G 5/0052 701/3 |
| 8,744,768 | B2 * | 6/2014 | Gutierez-Castaneda .................... | G08G 5/003 701/528 |
| 8,880,245 | B2 * | 11/2014 | Leberquer ............... | B64C 19/00 701/3 |

(Continued)

FOREIGN PATENT DOCUMENTS

EP        0236587 A2    9/1987

OTHER PUBLICATIONS

European Patent Office, European Search Report re Application No. 19174740.1-1204, dated Nov. 13, 2019, 8 pages, Munich, Germany.

*Primary Examiner* — Luis A Martinez Borrero
(74) *Attorney, Agent, or Firm* — McGarry Bair PC (57) ABSTRACT

A method and system of determining or estimating a descent profile includes receiving a final approach fix for a target destination, repeatedly back-calculating a set of subsequent models, determining a descent profile based on the repeated back-calculating the set of subsequent models, and operating the aircraft in accordance with the descent profile.

14 Claims, 5 Drawing Sheets

(56) References Cited

U.S. PATENT DOCUMENTS

| | | | | |
|---|---|---|---|---|
| 9,026,275 B1* | 5/2015 | Young | | G08G 5/0052 |
| | | | | 701/3 |
| 9,073,644 B2 | 7/2015 | Le Gall | | |
| 9,188,978 B2* | 11/2015 | Sacle | | G01C 23/00 |
| 9,193,442 B1* | 11/2015 | Young | | G08G 5/003 |
| 9,330,574 B1 | 5/2016 | Young | | |
| 9,423,799 B1* | 8/2016 | Wu | | G08G 5/0091 |
| 9,536,435 B1 | 1/2017 | Shay | | |
| 9,564,056 B1 | 2/2017 | Ghaemi | | |
| 9,613,537 B2* | 4/2017 | Meserole, Jr. | | G08G 5/0082 |
| 9,728,091 B2 | 8/2017 | Shay | | |
| 9,934,692 B2* | 4/2018 | Lacko | | G08G 5/025 |
| 10,089,893 B2* | 10/2018 | Dacre-Wright | | G08G 5/0013 |
| 10,126,756 B2* | 11/2018 | Boyer | | G08G 5/0021 |
| 10,134,289 B2* | 11/2018 | Moravek | | G08G 5/025 |
| 10,467,913 B1* | 11/2019 | Suiter | | G08G 5/0091 |
| 10,600,328 B2* | 3/2020 | Villele | | B64D 45/04 |
| 10,839,701 B2* | 11/2020 | Moravek | | G08G 5/025 |
| 2004/0075586 A1* | 4/2004 | Glover | | G08G 5/0086 |
| | | | | 340/963 |
| 2010/0241345 A1* | 9/2010 | Cornell | | G08G 5/0043 |
| | | | | 701/120 |
| 2011/0137495 A1* | 6/2011 | Sacle | | G05D 1/0676 |
| | | | | 701/3 |
| 2012/0277936 A1* | 11/2012 | Kumar Mn | | G05D 1/0676 |
| | | | | 701/16 |
| 2013/0103233 A1* | 4/2013 | Bourret | | B64D 45/04 |
| | | | | 701/18 |
| 2013/0204470 A1* | 8/2013 | Luckner | | B64C 9/20 |
| | | | | 701/18 |
| 2013/0211632 A1* | 8/2013 | Caule | | G05D 1/0676 |
| | | | | 701/3 |
| 2013/0218374 A1* | 8/2013 | Lacko | | G08G 5/025 |
| | | | | 701/16 |
| 2013/0238174 A1 | 9/2013 | Dewas et al. | | |
| 2014/0018980 A1* | 1/2014 | Bollapragada | | G08G 5/0021 |
| | | | | 701/10 |
| 2014/0039731 A1* | 2/2014 | Leberquer | | B64C 19/00 |
| | | | | 701/3 |
| 2014/0343760 A1 | 11/2014 | Le Gall et al. | | |
| 2014/0358415 A1* | 12/2014 | McDonald | | G08G 5/025 |
| | | | | 701/120 |
| 2015/0338853 A1* | 11/2015 | Casado Magana | | G08G 5/0026 |
| | | | | 701/5 |
| 2016/0063867 A1* | 3/2016 | Zammit | | G05D 1/101 |
| | | | | 701/18 |
| 2016/0085239 A1* | 3/2016 | Boyer | | G08G 5/025 |
| | | | | 701/5 |
| 2016/0362194 A1 | 12/2016 | Boyer | | |
| 2017/0018196 A1 | 1/2017 | Shay | | |
| 2017/0032683 A1* | 2/2017 | Meserole, Jr. | | G08G 5/0013 |
| 2017/0243495 A1* | 8/2017 | Moravek | | G08G 5/0039 |
| 2018/0075761 A1 | 3/2018 | De Villele | | |
| 2018/0114452 A1* | 4/2018 | Dacre-Wright | | G05D 1/0005 |
| 2018/0284813 A1* | 10/2018 | Boyer | | G08G 5/025 |
| 2019/0114931 A1* | 4/2019 | De Villele | | G08G 5/0021 |
| 2020/0026307 A1* | 1/2020 | Lax | | G05D 1/042 |

* cited by examiner

METHOD AND SYSTEM FOR DETERMINING A DESCENT PROFILE

METHOD AND SYSTEM FOR DETERMINING A DESCENT PROFILE STATEMENT REGARDING FEDERALLY SPONSORED RESEARCH OR DEVELOPMENT

This disclosure was made with government support under Contract No. DTFAWA-15-A-80013 awarded by the United States Federal Aviation Administration. The Government has certain rights in this disclosure.

BACKGROUND

A flight management system (FMS) is a computer-based system on-board an aircraft that performs a number of in-flight tasks, including in-flight management of a flight plan. FMSs have been in use for many years, and the programming techniques used by FMSs heretofore are designed for the computing capabilities of prior generations of computerized systems. For example, prior FMSs still in service today typically make assumptions regarding many of the complex and varied parameters regarding a flight path, including but not limited to pre-defined (i.e., constant) values for aspects regarding the aircraft and its performance characteristics and a constant value for aircraft operations such as, for example, a constant aircraft calibrated airspeed or Mach during a descent portion of flight.

BRIEF DESCRIPTION

In one aspect, the present disclosure relates to a method of determining a descent profile, the method including receiving, at a controller module, a final model of performance characteristics for an aircraft at a final approach fix for a target destination, determining, by the controller module, a first aircraft energy level of the final model, the first aircraft energy level defining a combined kinetic and potential energy of the aircraft at the final model, repeatedly back-calculating, by the controller module, a set of subsequent models based on successively larger aircraft energy levels, wherein each successive back-calculating determines a variable thrust parameter value of the respective subsequent model based on a minimizing cost profile, determining a descent profile based on the repeated back-calculating the set of subsequent models, and operating the aircraft in accordance with the determined descent profile.

In another aspect, the present disclosure relates to a system for determining a descent profile, the system including memory storing aircraft performance characteristics of a final approach fix for a target destination and a minimizing cost profile, a controller module configured to receive the performance characteristics and minimizing cost profile from the memory, to determine a first aircraft energy level based on the performance characteristics of the aircraft at the final approach fix, the aircraft energy level defining a combined kinetic and potential energy of the aircraft, to repeatedly back-calculate a set of subsequent aircraft performance models, to determine a descent profile based on the repeated back-calculating the set of subsequent models, and to provide the descent profile to a flight controller to operate the aircraft in accordance with the descent profile.

In yet another aspect, the present disclosure relates to a method of predicting a descent profile, the method including receiving, at a controller module, a final model of performance characteristics for an aircraft at a target altitude, determining, by the controller module, a first aircraft energy level of the final model, the first aircraft energy level defining a combined kinetic and potential energy of the aircraft at the final model, repeatedly back-calculating, by the controller module, a set of subsequent models based on successively larger aircraft energy levels, wherein each successive back-calculating determines a variable thrust parameter value of the respective subsequent model based on a minimizing cost profile, predicting a descent profile based on the repeated back-calculating the set of subsequent models, and operating the aircraft in accordance with the predicted descent profile.

DETAILED DESCRIPTION

Aspects of the disclosure can be implemented in any environment, apparatus, or method for determining or estimating a descent profile with a system regardless of the function performed by the descending device. For example, a descent profile can be utilized by air-based vehicles (e.g. fixed wing or rotor-based, such as a helicopter), such as aircraft, or water-based vehicles, such as submergible vehicles.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g. upper, lower, upward, downward, higher, lower, back, forward, above, below, vertical, horizontal, etc.) are only used for identification purposes to aid the reader's understanding of the disclosure, and do not create limitations, particularly as to the position, orientation, relative position of, or use thereof, unless otherwise stated. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. The exemplary drawings are for purposes of illustration only and the dimensions, positions, order and relative sizes reflected in the drawings attached hereto can vary.

As used herein, a "system" can include a "controller module" having at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The present disclosure relates to determining guidance instructions, such as a flight profile, that can include nonlinear programming. As used herein, the term "nonlinear programming" is the process of solving an optimization problem defined by a system of equalities and inequalities, collectively termed "constraints," over a set of unknown real variables, along with an objective function to be maximized or minimized, where some of the constraints or the objective function are nonlinear. It is the sub-field of mathematical optimization that deals with problems that are not linear. The flight profile can further include a subset of profiles, such as a climb profile, a cruise profile, or a descent profile. The flight profile can include, or define, a flight path determined, estimated, or predicted by applying the determined control to the equations of motion given assumed initial operating states and environment conditions. In some aspects, the present disclosure particularly relates to a system and process to reduce costs parameters for a descent phase or portion of a flight path using determinations, computations, calculations, estimations, predictions, or nonlinear programming. In some aspects, nonlinear programming techniques may be leveraged to more accurately and efficiently define a flight path descent profile and generate an optimal control trajectory. As used herein the term "determining" refers to a determination of the system or method of an outcome or result that has occurred or is occurring (e.g. a "current" or "present" outcome or result), and contrasts with the term "prediction," which refers to a forward-looking determination or estimation that makes the outcome or result known in advance of actual performance of the occurrence.

In some aspects, nonlinear programming may be used to solve a guidance optimization problem (e.g., minimizing fuel consumption, reducing flight time, satisfying scheduling constraints, etc.) that is defined by a system of constraints over a set of unknown real variables. The use of nonlinear programming techniques and current computing capabilities in combination can provide a mechanism to address and generate a solution for the complicated nonlinear problem(s) of guidance optimization. As used herein, the term aircraft, airplane, or plane may include commercial aircraft as addressed in Title 14 of the Code of Federal Regulations part 25 (14 CFR part 25) containing rules for Airworthiness Standards: Transport Category Airplanes, drones, and other aerial vehicles.

Figure 1:
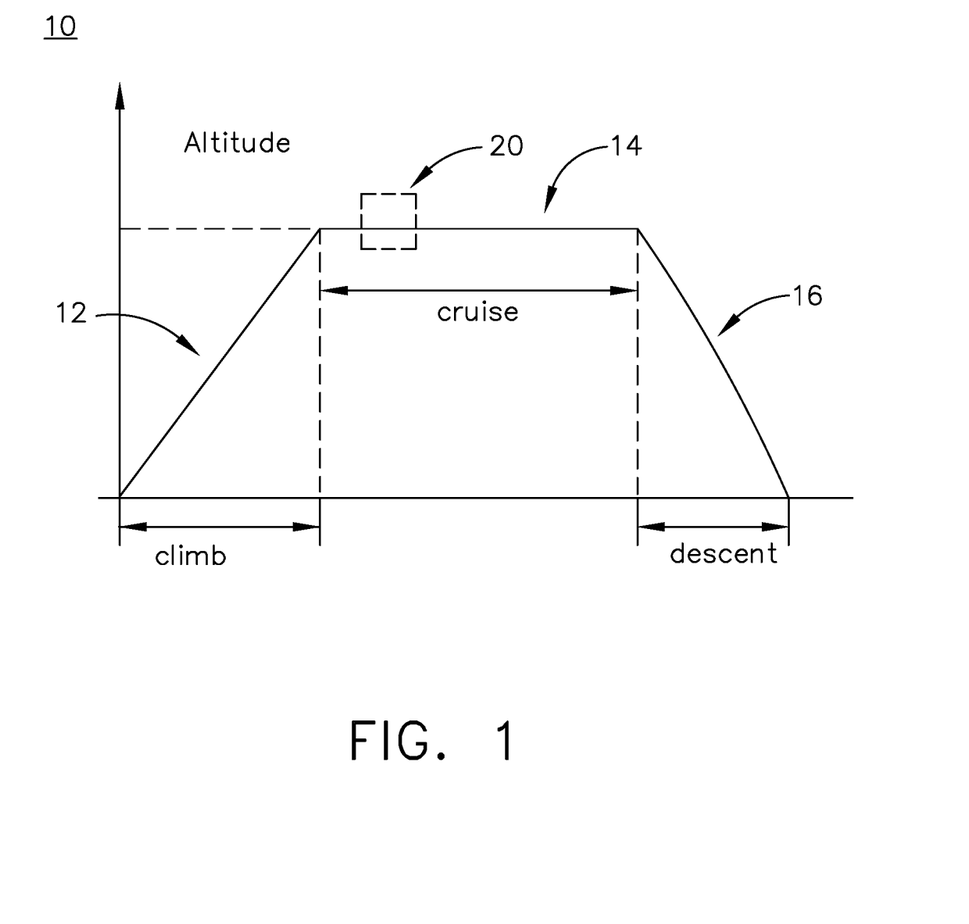
FIG. 1 illustrates a flight profile of an aircraft, in accordance with various aspects described herein.

Referring to FIG. 1, illustrated in graph format is a flight profile 10, such as a flight path for an aircraft (shown schematically as dotted box 20 flying along the flight profile 10). As shown, the flight profile 10 generally includes three phases or portions, including a climb profile 12 or ascent profile, a cruise profile 14, and a descent profile 16. The graph in FIG. 1 shows the general relationship between the altitude (vertical axis) and the range of an aircraft 20 (horizontal axis). Aspects of the disclosure can include determining, estimating, or predicting an efficient descent profile 16. As used herein, an "efficient" descent profile 16 can include, but is not limited to, a descent profile 16 and that reduces or minimizes a cost value of the descent profile 16, such as fuel consumption, descent time, rescheduling costs, or the like. Additional "costs" can be included when determining the efficient descent profile 16, or the efficiency of the descent profile.

Figure 2:
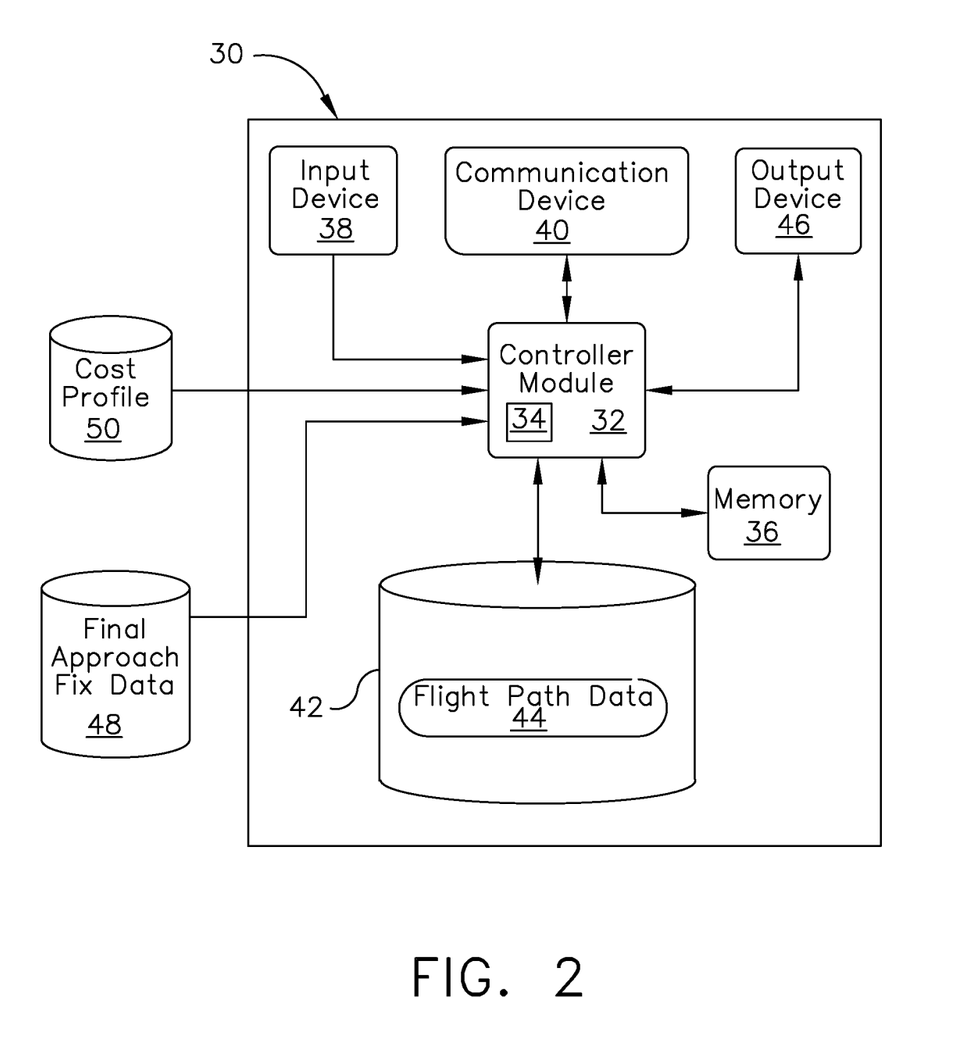
FIG. 2 illustrates a schematic view of an aircraft system for operating a flight profile such as in FIG. 1, in accordance with various aspects described herein.

FIG. 2 illustrates a system 30 for determining the descent profile 16 of FIG. 1 including determining the descent profile 16 while the aircraft 20 is flying along the flight profile 10. As shown, the system 30 can include a controller module 32 having a processor 34 and communicatively connected with memory 36. Non-limiting aspects of the system 30 can further include a set of input devices 38, a communication device 40, a set of output devices 46, and a flight profile database 42 having or storing flight path data 44. Non-limiting examples of the flight path data 44 can include calculated profile data for the flight profile 10, or portions thereof In another non-limiting example, the flight profile database 42 or flight path data 44 can include a set of flight path data 44, such as previously determined data or flight profiles 10, or temporarily computed data or flight profiles 10. In this instance, present or temporary flight path data 44 can be compared with previously determined flight path data 44. In another non-limiting aspect of the disclosure, the flight path data 44 can include parametric data related to the flight path or flight profile, or a subportion thereof. For instance, the flight path data 44 can include waypoint data, approach data, or a respective set of performance characteristic "point" data, wherein a set of "points" can define a determined, estimated, or predicted position, airspeed, altitude, heading, or the like, for a series or sequence of points along the flight path. In another non-limiting example, the set of performance characteristic "point" data can further define additional characteristics of the aircraft 20, including but not limited to deterioration parameters (e.g. reflecting aircraft performance characteristic changes related to the age of the aircraft, or components thereof), or personalization parameters (e.g. reflecting different configurations or components of a particular aircraft 20, such as engines, within a fleet of aircraft). In this sense, the flight path data 44 or flight profile can include a series or sequence of individual or discrete "points" or "models."

In one example, the set of input devices 38 can be adapted to provide or supply aircraft data to the controller module 32 and can include, but are not limited to, sensors, detectors, additional systems, or the like. The aircraft data can be adapted or related to aspects of the aircraft 20, present or predicted flight, and utilized for establishing, determining, estimating, or predicting aspects related to the flight path data 44. In this sense, the aircraft data can be utilized to inform or update current, estimated, or future flight path data 44.

In another example, the set of output devices 46 can be adapted to receive data or communications of the system 30, such as a flight management system (FMS), an autopilot system, an autoflight system, an autoland system, or the like. In yet another non-limiting example, aspects of the system 30 can be included as a portion of the FMS, or another aircraft 20 or avionics system. In only non-limiting example, the system 30 can provide aspects of the flight profile database 42 or flight path data 44 to another receiving device. Non-limiting aspects of the communication device 40 can include any systems, transmitters, receivers, signal generators, or other mechanisms configured to enable communication between the system 30 and another device or system. For example, the communication device 40 can be adapted for transmission and receiving communications with ground-based systems, airport command and control systems, weather systems, or satellite-based systems, other aircraft, or the like. In this sense, the system 30 can utilize the communication device 40 to receive additional aircraft data or communications adapted or related to aspects of the aircraft's 20 present or predicted flight path data 44, or can communicate aspects of the flight path data 44 to another device, system, or the like. Thus, the communication device 40 can act or perform as an input device (similar to the set of input devices 38), and output device (similar to the set of output devices 46), or a combination thereof. As used herein, the communication device 40 can be adapted to handle digital or data transmissions (e.g. uploads or downloads) as well as analog or non-data transmissions (e.g. voice radio, etc.).

Additional non-limiting aspects of the system 30 can be included wherein at least one of the system 30 or the controller module 32 is communicatively connected with a database of final approach fix data 48 and a database of cost profile data 50. As used herein, "final approach fix data" 48 can include data related to the final approach, or landing approach, toward a flight destination such as an airport. Final approach fix data 48 can define expected performance characteristics or parameters for an aircraft 20 on final approach to land at the destination. The expected performance characteristics can include, but are not limited to, one or more discrete points of performance characteristics including, but not limited to, a final approach airspeed, a final approach horizontal distance (e.g. relative to the destination), a final approach altitude, heading, or the like. In one non-limiting example, the final approach fix data 48 can be predefined by way of a set of standard performance characteristics, and stored, kept, or maintained by an accessible database, the respective destination, or the like.

The cost profile data 50 can include data or values associated with operating, flying, maintaining, or otherwise utilizing the aircraft 20. The cost profile data 50 can be adapted to supply or provide cost or value data to the controller module 32. For example, the cost profile data 50 can include data related to fuel costs or value, fuel burn rates based on thrust, values associated with scheduling (e.g. passenger scheduling costs, or crew scheduling costs), and the like.

While the final approach fix data 48 and the cost profile data 50 are shown remote from the system 30, non-limiting aspects of the system 30 can be included wherein, for example, the final approach fix data 48 and the cost profile data 50 are included in the system 30. For instance, at least a portion of the final approach fix data 48 or the cost profile data 50 can be duplicated, copied, or stored in the memory 36 of the system 30. In another instance, at least a portion of the final approach fix data 48 or the cost profile data 50 can be received by the system 30 or memory 36 by way of a transmission provided to the communication device 40. Additionally, while the set of input devices 38, communication device 40, and the set of output devices 46 are illustrated as a portion of the system 30, non-limiting aspects of the disclosure can be included wherein the set of input devices 38, communication device 40, the set of output devices 46, or a subset thereof, are located remotely from the system 30 and communicatively connected with the system 30.

Figure 3:
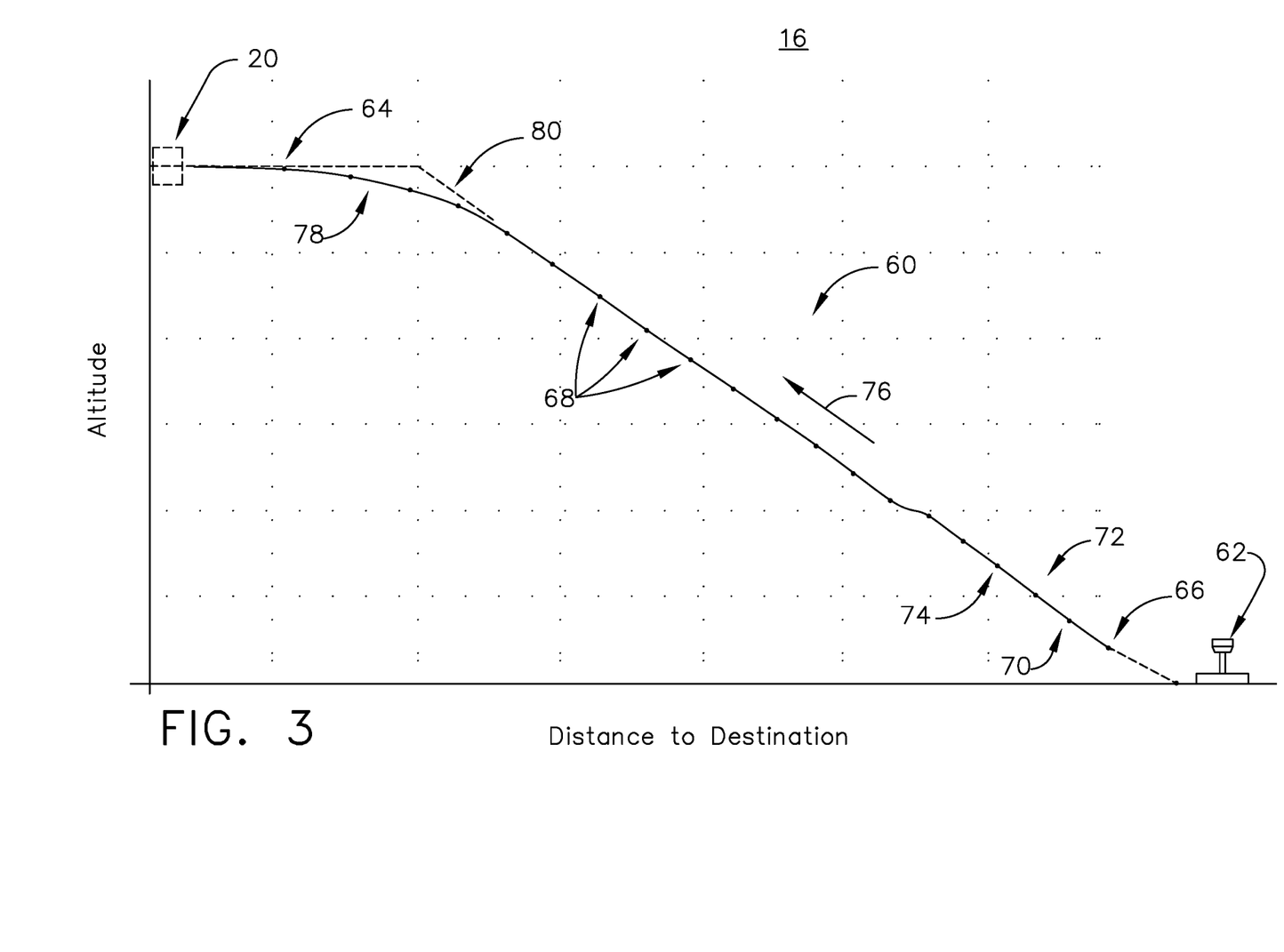
FIG. 3 illustrates a descent profile of the flight profile of FIG. 1, in accordance with various aspects described herein.

FIG. 3 illustrates an exemplary plot graph that can form the descent profile 16 of FIG. 1. FIG. 3 includes a limited portion of the end of the cruise profile 14, for understanding of the initial descent. The descent profile 16 can include a descent trajectory 60 of an aircraft 20 descending toward a landing destination, shown as an airport 62. In one non-limiting example, the descent profile 16 can include additional information related to the descent of the aircraft 20 and not captured by the descent trajectory 60. For example, aspects of the descent profile 16 can include cost analysis, weather interactions, timing considerations, or the like, while the descent trajectory 60 can be limited to, for instance, airspeed, heading, throttle controls, or aircraft-specific characteristics. The descent trajectory 60 is shown comprising a subset of discrete points or "models" 68 along the trajectory 60, including an initial or first model 64, such as a cruising model or trajectory, as well as a final model 66, such as a final approach fix model, and final approach fix trajectory (extending from final model 66 to airport 62, shown in dashed line). While discrete points are described, the set of models 68 can include a continuous trajectory 60 or range, and are not limited to specific and separated "points." In this sense, the descent trajectory 60 can be a continuous, contiguous, or uninterrupted trajectory 60 comprising one or more models 68.

The set of models 68 can be defined by performance characteristics of the aircraft 20 at respective points in the descent profile 16 or the descent trajectory 60. Non-limiting aspects of the final model 66, or performance characteristics thereof, can be defined by the final approach fix data 48. In this sense, aspects of the final model 66 can be predefined, standardized, or the like, regardless of the descent profile 16 or descent trajectory 60. While one example of the final model 66 (e.g. the bottom of the descent) is described as the final approach fix model, further non-limiting examples of the disclosure can utilize a final model 66 that is not the final approach fix model, but rather another or a different altitude compared with the current or predicted altitude of the aircraft 20. For example, the final model 66 can be a lower cruise altitude, or to a temporary holding altitude in descent.

Aspects of the disclosure can be included wherein the system 30 described with respect to FIG. 3 can be configured to determine, generate, calculate, or otherwise define the descent profile 16 or the descent trajectory 60. Defining the descent profile 16 or the descent trajectory 60 can occur during a flight, prior to initiating the descent profile 16 of the aircraft 20, or can occur during a descent profile 16 (e.g. re-determining or re-generating an updated descent profile 16). In another non-limiting example, aspects of the system 30 can estimate or predict a future descent profile 16 or descent trajectory 60 prior to a flight occurring, or well in advance of the operating the aircraft 20 (e.g. hours, days, weeks, etc.). In another non-limiting example, the system 30 can be configured to share or distribute the determining, generating, calculating, or otherwise defining the descent profile 16 or the descent trajectory 60 between disparate or remotely located systems (e.g. shared between a ground-based computer and the FMS of a flying aircraft 20).

The system 30 can operably determine, predict, or estimate the descent profile 16 or the descent trajectory 60 by starting with the final model 66, which is predetermined, and back-calculating models 68 of the descent profile 16 or descent trajectory 60 upward along the descent profile 16 (e.g. back-calculating subsequent models at a greater distance away from the airport 62, higher in altitude, or a combination thereof). As used herein, the "upward" direction along the descent profile 16 is represented with arrow 76. The system 30 operates to back-calculate the set of subsequent models 68 in the upward direction 76 by solving or calculating performance characteristics of a subsequent model 68 based on the immediately preceding model 68. "Preceding" in this description refers to a direction opposite the upward direction 76.

Thus, when the system 30 receives the final model 66 having aircraft 20 performance characteristics at the final approach fix, such as based on the final approach fix data 48, the system 30 can subsequent back-calculate the next model, such as a second model 70, in the upward direction from the final model 66. Similarly, the system 30 can subsequent back-calculate the following model, such as a third model 72, based on the second model 70, and can then back-calculate a fourth model 74, based on the third model 72, and so on in the upward direction 76.

Each back-calculation of the set of models 68 can solve for one or more aircraft 20 performance characteristics, including but not limited to airspeed or variable thrust parameter controls. In one non-limiting aspect, the system 30 can further solve for aircraft 20 performance characteristics that are constrained or otherwise limited, such as solving for variable thrust controls that different from or greater than idle thrust control values (e.g. performance characteristics of thrust greater than zero or partial thrust). In another non-limiting example, the variable thrust controls can be constrained or otherwise limited only during a portion of the descent profile 16, such as during the first half of the descent profile 16. In this instance, the first "half" of the descent profile 16 can be defined by altitude, time, the like, or a combination thereof.

As used herein, "thrust parameter controls," "thrust parameter values," or the like, refer to settings, inputs, control system responses, or the like enable or configured to adjust a thrust or thrust output for an aircraft 20 or aircraft engine. In one non-limiting example, thrust parameter values can include engine control settings or parameters, fuel consumption settings or parameters, or the like. In another non-limiting example, thrust parameter values can include a combination of settings or parameters enabling the thrust or thrust output.

Each back-calculation for the set of models 68 can also be based on cost values or cost parameters defined by the cost profile database 50. For instance, the system 30 can solve for aircraft 20 performance characteristics, such as airspeed or variable thrust controls, based on minimizing costs or values defined by the cost profile database 50 and specific each subsequent model 68.

In another non-limiting example, the system 30 can also solve for the one or more aircraft 20 performance characteristics by first calculating a threshold value at each respective model 68. One example of a threshold value that can be calculated at each respective model 68 can be an aircraft energy value, that is, the total or summation of an actual, an estimated, a predicted, or an arbitrary amount of potential and kinetic energy of the aircraft 20 at the respective model 68. In another example, by knowing or having previously calculated the preceding model 68, the subsequent back-calculating of a model 68 can be at least partially based on, for instance, an actual, an estimated, a predicted, or a determined airspeed or thrust control of the aircraft 20 at the respective model 68 (e.g. values that will be related to the kinetic energy of the aircraft 20). Alternatively, the subsequent back-calculating of a model 68 can be at least partially based on, for instance, an actual, an estimated, a predicted, or a determined altitude of the aircraft 20 at the respective model 68 (e.g. values that will be related to the potential energy of the aircraft 20). In yet another example, the subsequent back-calculating of a model 68 can be at least partially based on a subset of the airspeed, thrust control, altitude, or any other performance characteristic defined or calculated in the preceding model 68. The subsequent back-calculating can further be based on additional state information of the aircraft 20 or environment, such as data received by the set of input devices 38 or communication device 40, and including but not limited to atmospheric information, flight path constraints, vehicle constraints, airport traffic, convective weather models, or the like.

Thus, the repeated back-calculating of the set of subsequent models 68 can be based on, for example, successively larger or higher aircraft 20 energy levels, wherein the energy levels are successively larger or higher due to higher altitudes and higher airspeed or thrust controls as the back-calculating models 68 moves in the upward direction 76. Non-limiting examples of successively larger or higher aircraft 20 energy levels can based on predetermined, determined, calculated, actual, estimated, predicted, or arbitrary increases in energy levels. In one non-limiting example, the repeated back-calculating can stop or cease when the back-calculating reaches, meets, exceeds, or satisfies a current performance characteristic of the aircraft 20 (e.g. the current altitude, current airspeed, or a combination thereof), as sensed or measured by the system 30 (e.g. by way of the set of input devices 38 or the communication device 40). Alternatively, the repeated back-calculating can stop or cease when the back-calculating reaches, meets, exceeds, or satisfies the first model 64.

The system 30 can further determine, estimate, or predict the descent profile 16 or descent trajectory 60 based on the repeated back-calculating of the set of subsequent models 68, as described. The system 30 can provide the determined or predicted descent profile 16 to another system by way of the set of output devices 46 or the communication device 40, such as an autoflight, autopilot, or autoland system, such that the aircraft 20 can be flow in accordance with the determined or predicted descent profile 16. In another non-limiting example, the system 30, or another system connected with the system 30, can generate, provide, or otherwise determine instructions for a pilot to follow in accordance with the determined or predicted descent profile 16.

Thus, when determining or predicting the descent profile 16, aspects of the disclosure can generate a reduced cost descent profile 16, compared with legacy descent profile procedures. The reduced cost descent profile 16 can further commence with an earlier descent 78 (e.g. at a further distance from the destination or airport 62), and with at least a variable partial thrust control in the first half of the descent profile 16, compared with a legacy descent profile commencement (shown in dotted line 80). In one non-limiting example, the determined or predicted descent profile 16 having an earlier descent 78 and variable partial thrust control can save approximately 0.7 percent in costs, such as fuel burn or flight time.

Many other possible aspects and configurations in addition to that shown and described are contemplated by the present disclosure. For example, one aspect of the disclosure contemplates that the system 30 can calculate, estimate, or predict aircraft operating characteristics of the descent profile 16 or descent trajectory 60 between the set of back-calculated models 68. Another aspect of the disclosure contemplates the system 30 can also determine the descent profile 16 based at least partially on determined, calculated, estimated, or predicted weight of the aircraft 20. For example, the system 30 can estimate or predict an aircraft 20 weight at the estimated or predicted initial descent point of the descent profile 16, based on, for example, a fuel burn rate (which affects weight of the aircraft 20), the cruise profile 14, the overall flight profile 10 or current flight plan, an estimated horizontal distance of the aircraft 20 at the initial descent point, the like, or a combination thereof. The system 30 can then perform the repeated back-calculating, as described herein. Once the system 30 determines or predicts the descent profile 16, the system 30 can further determine or predict an aircraft 20 weight based on the first model 64, the horizontal distance of the descent profile 16, and the descent profile 16 performance characteristics such as the variable thrust parameter values. The system 30 can then compare the estimated or predicted aircraft weight at the initial descent point with the back-calculated estimated or predicted aircraft weight of the descent profile 16, and upon satisfying the comparison (e.g. the comparison is outside of a value, range, threshold, or tolerance), repeating the process to determine or predict a new descent profile 16 by repeatedly back-calculating a new set of models 68 utilizing an updated prediction or estimation of the aircraft weight at the initial descent point.

Figure 4:
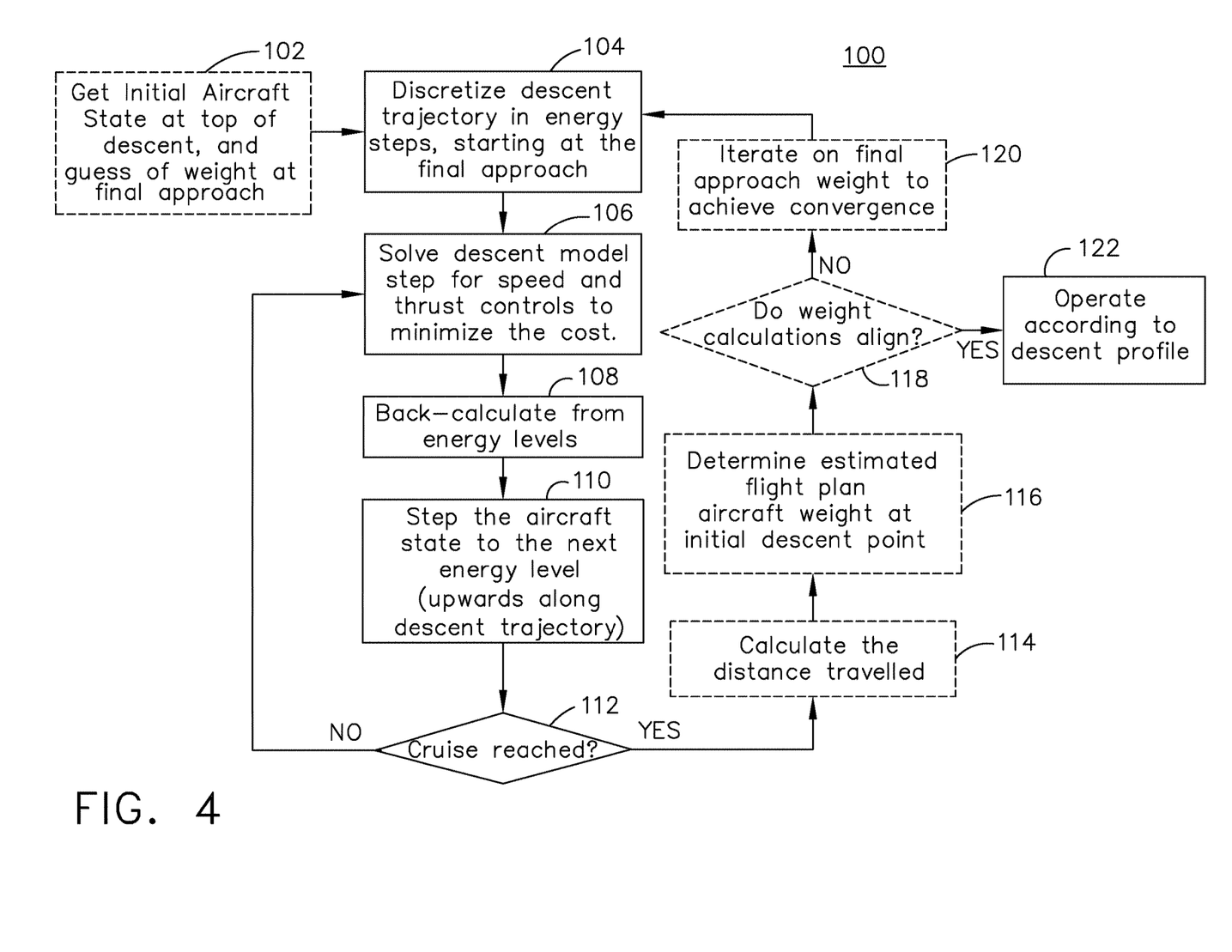
FIG. 4 illustrates a flow chart diagram demonstrating a method of determining the descent profile of FIG. 3, in accordance with various aspects described herein.

FIG. 4 illustrates a first flowchart demonstrating a method 100 of determining the descent profile 16, as described. The method 100 can start by optionally determining, predicting, or estimating an initial aircraft 20 state at the top of the descent, and determining, predicting, or estimating the aircraft 20 weight at the final approach fix, at 102. The method 100 can then begin discretizing the descent trajectory 60 in energy steps, starting at the final approach fix or the final model 66, at 104. Next, the method 100 solves the respective model 66, 68 for speed and thrust controls, for example, to minimize the costs, as defined by the cost profile data 50, at 106, followed by back-calculating the subsequent model 68 based on energy levels, at 108. The method 100 then steps the aircraft 20 state to the next energy level in the upward direction 76 along the descent trajectory 60, at 110. The method 100 then determines if the next energy level corresponds with the cruise altitude, cruise speed, cruise profile 14, or the like, at 112. If the next energy level does not correspond with the cruise altitude, cruise speed, cruise profile 14, or the like, the method 100 returns to step 106 to repeat steps 106-110 until cruise is reached. If the next energy level does correspond with the cruise altitude, cruise speed, cruise profile 14, or the like in step 112, then the method 100 continues to step 114.

In step 114, the method 100 optionally calculates a horizontal distance travelled by the aircraft 20 along the descent profile 16 determined during the repeated back-calculating of steps 106-110. The method 100 then optionally determines the current flight plan aircraft 20 weight at the first model 64 of the determined descent profile 16, at 116. The method 100 optionally determines if the weight calculations align (e.g. whether the comparison of the estimated or predicted aircraft weight at the initial descent point and the back-calculated estimated or predicted aircraft weight of the descent profile 16 is satisfied), at 118. If the weight calculations do not align, the method 100 optionally iterates the final approach weight to achieve convergence at 120, and returns to step 104 with the iterated aircraft 20 weight at the final approach fix. If the weight calculations align in step 118, or after cruise is reached in step 112, the aircraft 20 can be operated in accordance with the determined descent profile 16, at 122.

A working example of the method of FIG. 4 can be instructive. For example, the method 100 can make an estimate of the aircraft 20 state at the top of the descent (e.g. the first model 64) and determining, predicting, or estimating the aircraft 20 weight at the final approach fix (e.g. at the final model 66), at 102. Next the method 100, using the final approach fix data 48 can define the performance characteristics of the final model 66, including but not limited to airspeed, altitude, trajectory, etc., at 104. Knowing the airspeed, altitude, trajectory, and the like, the method 100 can utilize parametric equations to solve for the thrust controls at the final model 66, minimizing the cost of operating the aircraft 20 at the final model 66 utilizing the cost profile data 50, at 106. In step 106 or 108, the method 100 can also calculate a total aircraft energy of potential energy and kinetic energy, knowing the airspeed, altitude, trajectory, and the like.

Next, the method 100 steps upward to the next model (e.g. the second model 70 in FIG. 3), and adds an amount of energy to the total aircraft energy levels, in 110. The amount of energy added can be a set value, an arbitrary value, or the like. In one example, the method 100 can add 50 kilojoules of energy, such as specific energy (e.g. energy divided by mass) when stepping upward to the next model. In another example, the amount of energy added can correspond to an expected or predetermined altitude step, such as 500 feet of altitude between the prior model and the next model. If cruise is not reached, the method returns to step 106, continuing to step 108, where the method 100 beings to repeat the back-calculating for the second model 70. The added aircraft energy can be divided between a faster airspeed of the aircraft 20 at the second model 70 (compared with final model 66, e.g. added kinetic energy), a higher altitude of the aircraft 20 at the second model 70 (compared with the final model 66, e.g. added potential energy), or a combination thereof, at step 106. Knowing the airspeed, altitude, trajectory, and the like, the method 100 can utilize parametric equations to solve for the thrust controls at the second model 70, minimizing the cost of operating the aircraft 20 at the final model 66 utilizing the cost profile data 50, at 106. The method 100 can further calculate an estimated aircraft weight at the second model 70, now knowing the thrust controls and horizontal distance covered between the second model 70 and the final model 66 (e.g. calculating a fuel consumption).

Next the method 100 can step upward to the next model (e.g. the third model 72 in FIG. 3), and adds an amount of energy to the total aircraft energy levels, in 110, and continues to repeatedly calculate the set of models 66 and corresponding performance characteristics until reaching the cruising altitude of the aircraft. Once reaching cruising altitude of the set of models 66, the method 100 can calculate the distance traveled by the updated descent profile 16, knowing the thrust calculations, airspeed, trajectories, and the like, in 114, and determine the fuel consumption of the updated descent profile 16 and corresponding aircraft weight at top of the descent (e.g. the first model 64), in 116. If, in step 118, the aircraft weight at the first model 64 does not align with estimated weight from step 102, the method 100 can iterate the estimated aircraft weights from step 102, and back-calculate an additional updated descent profile 16 until achieving convergence in steps 104-118. The aircraft can then be operated in accordance with the updated descent profile 16.

While FIG. 4 is described as illustrating the determining the descent profile 16, non-limiting aspects of the disclosure can be included wherein the method 100 and description of FIG. 4 is applied to a method of predicting the descent profile 16, as described.

Figure 5:
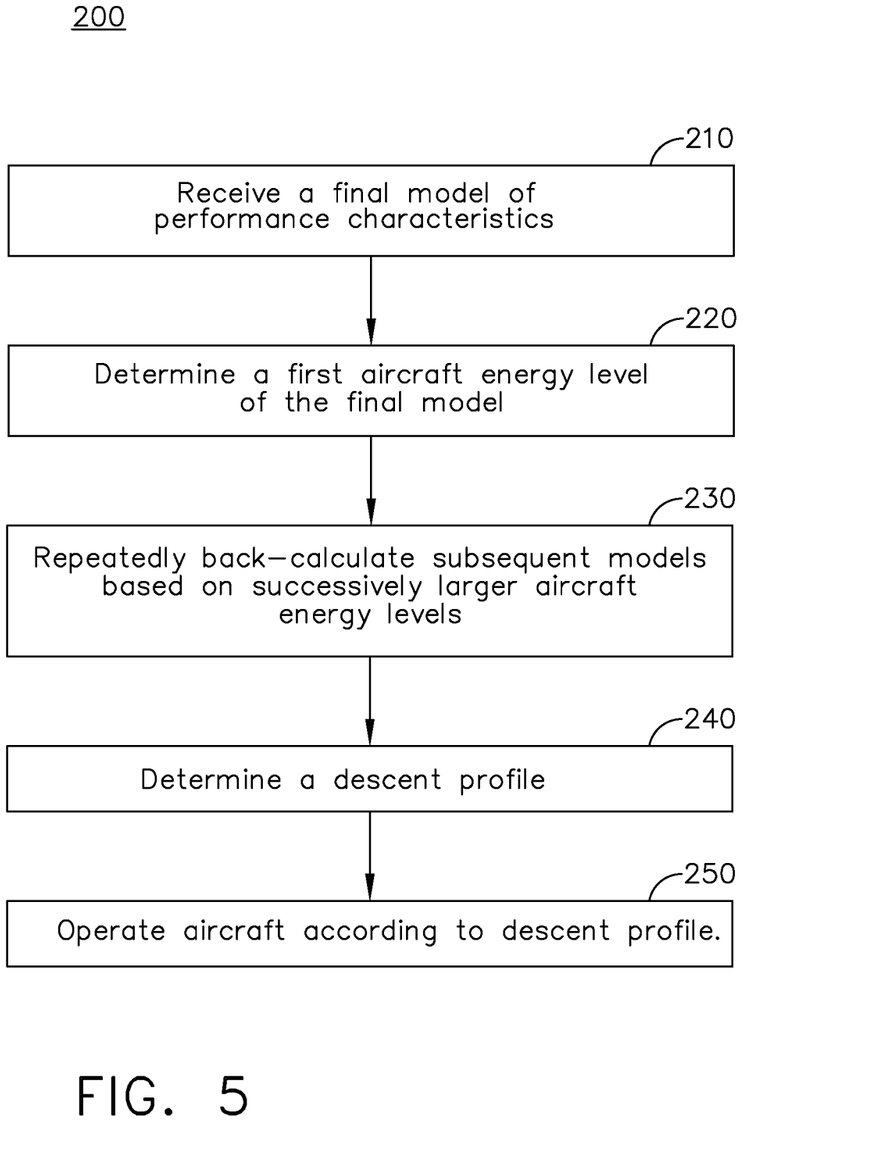
FIG. 5 illustrates another flow chart diagram demonstrating a method of determining the descent profile of FIG. 3, in accordance with various aspects described herein.

FIG. 5 illustrates a second flowchart demonstrating another method 200 of determining the descent profile 16, as described. The method 200 starts by receiving, at the controller module 32, the final model 66 of performance characteristics for the aircraft 20 at the final approach fix for a target destination, at 210. Next, the method 200 determines, by the controller module 32, a first aircraft energy level of the final model 66, the first aircraft energy level defining the combined kinetic and potential energy of the aircraft 20 at the final model 66, at 220. The method 200 then proceeds to repeatedly back-calculate, by the controller module 32, a set of subsequent models 68 based on successively larger or higher aircraft energy levels, wherein each successive back-calculating determines a variable thrust parameter value of the respective subsequent model 68 based on a minimizing cost profile, for example, defined by the cost profile data 50, at 230.

The method 200 then determines the descent profile 16 based on the repeated back-calculating the set of subsequent models 68 at 240, and operates the aircraft 20 in accordance with the determined descent profile 16 at 250. While FIG. 5 is described as illustrating the determining the descent profile 16, non-limiting aspects of the disclosure can be included wherein the method 200 and description of FIG. 5 is applied to a method of predicting the descent profile 16, as described.

The sequences depicted in methods 100 and 200 are for illustrative purposes only and is not meant to limit the methods 100, 200 in any way as it is understood that the portions of the method can proceed in a different logical order, additional or intervening portions can be included, or described portions of the method can be divided into multiple portions, or described portions of the method can be omitted without detracting from the described method.

The aspects disclosed herein provide method and system for determining or predicting a descent profile. The technical effect is that the above described aspects enable the determining, predicting, or otherwise generation of a descent profile to be flown by an aircraft. One advantage that can be realized in the above aspects is that the above described aspects reduce flight operation costs during the descent phase of the aircraft. The costs can be measured in time, scheduling, fuel consumption, or other aspects captured by the cost profile data 50. Another advantage of the disclosure can include a smoother transition to the descent profile from the cruise profile, improving passenger ride quality.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of determining a descent profile, the method comprising:
    receiving, at a controller module, a final model of performance characteristics for an aircraft at a final approach fix for a target destination;
    determining, by the controller module, a first aircraft energy level of the final model, the first aircraft energy level defining a combined kinetic and potential energy of the aircraft at the final model;
    repeatedly back-calculating, by the controller module, a set of subsequent models based on successively larger aircraft energy levels, wherein each successive back-calculating determines a variable thrust parameter value of the respective subsequent model based on a minimizing cost profile;
    determining a descent profile based on the repeated back-calculating the set of subsequent models;
    determining an estimated descent profile aircraft weight at an initial descent point based on the determined descent profile, the set of variable thrust parameter values, an estimated horizontal distance of the determined descent profile, and an estimated final approach aircraft weight of the final model;
    determining an estimated flight plan aircraft weight at the initial descent point based on a current flight plan of the aircraft;
    comparing the estimated flight plan aircraft weight with the estimated descent profile aircraft weight;
    upon satisfaction of the comparing, updating the estimated final approach aircraft weight of the final model, and repeating the determining the first aircraft energy level and repeatedly back-calculating the set of subsequent models; and
    operating the aircraft in accordance with the determined descent profile.

2. The method of claim 1 wherein repeatedly back-calculating the set of subsequent model includes stepping upwards along a descent trajectory in each repeated back-calculating.

3. The method of claim 1 wherein the variable thrust parameter value is different from an idle thrust value.

4. The method of claim 1 wherein repeatedly back-calculating the set of subsequent models further comprises repeatedly back-calculating until the aircraft energy level reaches a cruising altitude for the aircraft.

5. The method of claim 4 wherein the cruising altitude for the aircraft is at least one of a current or estimated cruising altitude for the aircraft.

6. The method of claim 1 wherein the minimizing cost profile is based on minimizing fuel consumption at each subsequent model.

7. The method of claim 1 wherein receiving the final model of performance characteristics for the aircraft at the final approach fix for the target destination includes receiving at least a subset of: a final approach speed, a final approach altitude, and a final approach distance relative to the target destination.

8. The method of claim 7 wherein receiving the final model includes receiving a predetermined set of performance characteristics for the target destination from a final approach fix database.

9. The method of claim 1 wherein repeatedly back-calculating the set of subsequent models based on successively larger aircraft energy levels further comprises determining an estimated airspeed and an estimated altitude of the aircraft based on the immediately preceding model.

10. A system for determining a descent profile, the system comprising:
  memory storing aircraft performance characteristics of a final approach fix for a target destination and a minimizing cost profile;
  a controller module configured to:
    receive the performance characteristics and minimizing cost profile from the memory;
    determine a first aircraft energy level based on the performance characteristics of the aircraft at the final approach fix, the aircraft energy level defining a combined kinetic and potential energy of the aircraft;
    repeatedly back-calculate a set of subsequent aircraft performance models, to determine a descent profile based on the repeated back-calculating the set of subsequent models;
    determine an estimated descent profile aircraft weight at an initial descent point based on the determined descent profile, the set of variable thrust parameter values, an estimated horizontal distance of the determined descent profile, and an estimated final approach aircraft weight of the final model;
    determine an estimated flight plan aircraft weight at the initial descent point based on a current flight plan of the aircraft;
    compare the estimated flight plan aircraft weight with the estimated descent profile aircraft weight;
    upon satisfaction of the comparing, update the estimated final approach aircraft weight of the final model, and repeating the determining the first aircraft energy level and repeatedly back-calculating the set of subsequent models; and
    provide the descent profile to a flight controller to operate the aircraft in accordance with the descent profile.

11. The system of claim 10 further comprising a flight management system.

12. The system of claim 10 wherein the controller module is further configured to repeatedly back-calculate the set of subsequent models by stepping upwards along a descent trajectory in each repeated back-calculation.

13. The system of claim 10 wherein the minimizing cost profile is based on minimizing fuel consumption at each subsequent model.

14. The system of claim 10 wherein the controller module is further configured to repeatedly back-calculate the set of subsequent models based on successively larger aircraft energy levels and determine an estimated airspeed and an estimated altitude of the aircraft based on the immediately preceding model.

* * * * *